United States Patent
Brink

[11] Patent Number: 6,082,524
[45] Date of Patent: Jul. 4, 2000

[54] COMPOSITE SCRAPER BLADE

[75] Inventor: Jan Louis Brink, Centurion, South Africa

[73] Assignee: Slic Trading Company Limited, United Kingdom

[21] Appl. No.: 09/294,146

[22] Filed: Apr. 20, 1999

[30] Foreign Application Priority Data

Jul. 2, 1998 [ZA] South Africa ............................ 98/5798

[51] Int. Cl.[7] .................................................. B65G 45/16
[52] U.S. Cl. ............................................ 198/499; 198/497
[58] Field of Search ...................................... 198/497, 499

[56] References Cited

U.S. PATENT DOCUMENTS

| | | | |
|---|---|---|---|
| 4,962,845 | 10/1990 | Gibbs | 198/499 |
| 5,011,002 | 4/1991 | Gibbs | 198/499 X |
| 5,197,587 | 3/1993 | Malmberg | 198/499 X |
| 5,413,208 | 5/1995 | Veenhof | 198/497 |
| 5,692,595 | 12/1997 | Gilbert | 198/499 |
| 5,944,167 | 8/1999 | Brink | 198/499 X |

FOREIGN PATENT DOCUMENTS

| | | | |
|---|---|---|---|
| 338 118 | 10/1989 | European Pat. Off. | 198/497 |
| 63-282017 | 11/1988 | Japan | 198/499 |

*Primary Examiner*—James R. Bidwell
*Attorney, Agent, or Firm*—Young & Thompson

[57] ABSTRACT

A conveyor belt scraper which includes an elastomeric base member, a holder engaged with the base member and a wear resistant scraping insert engaged with the holder.

12 Claims, 2 Drawing Sheets

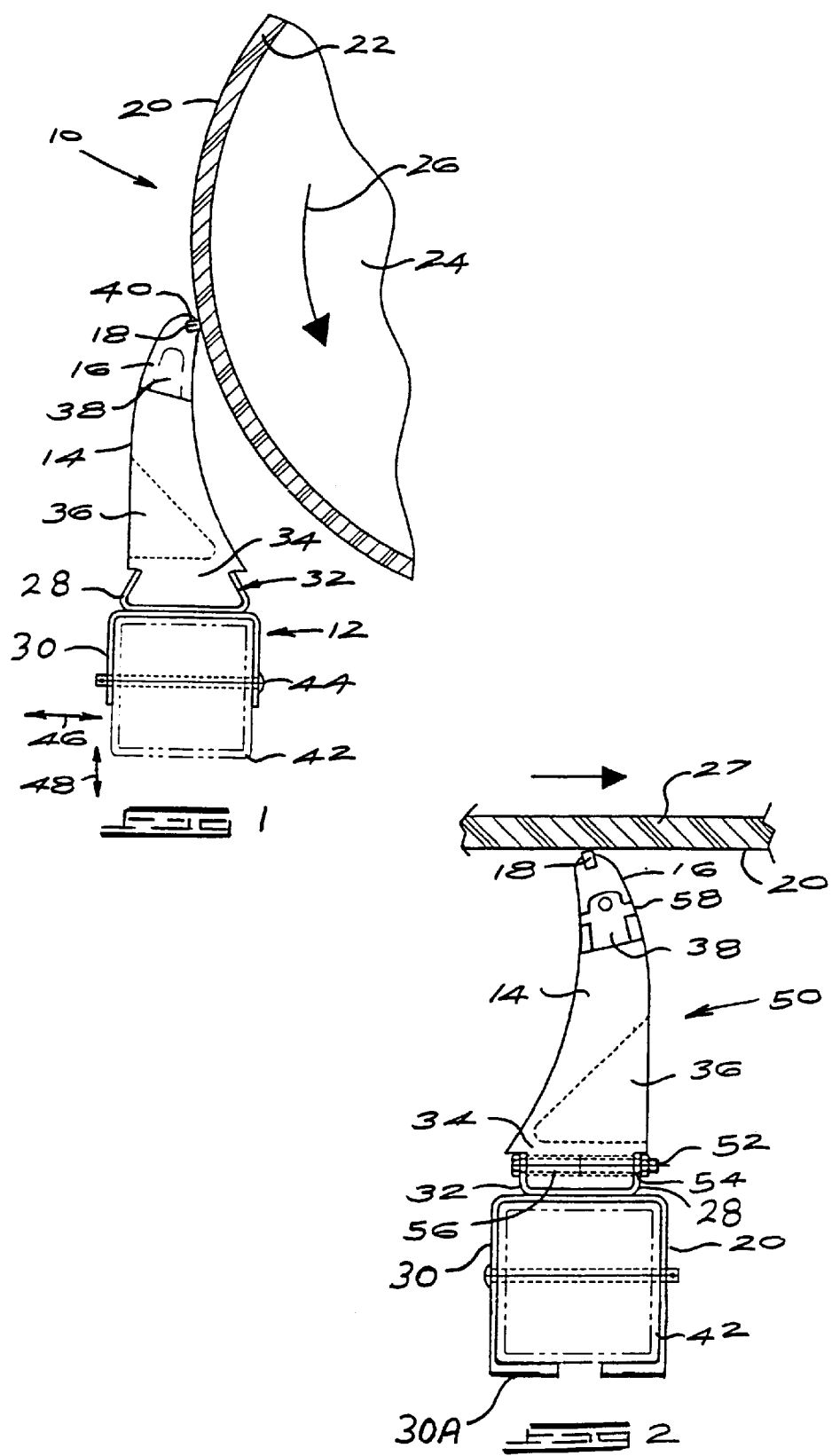

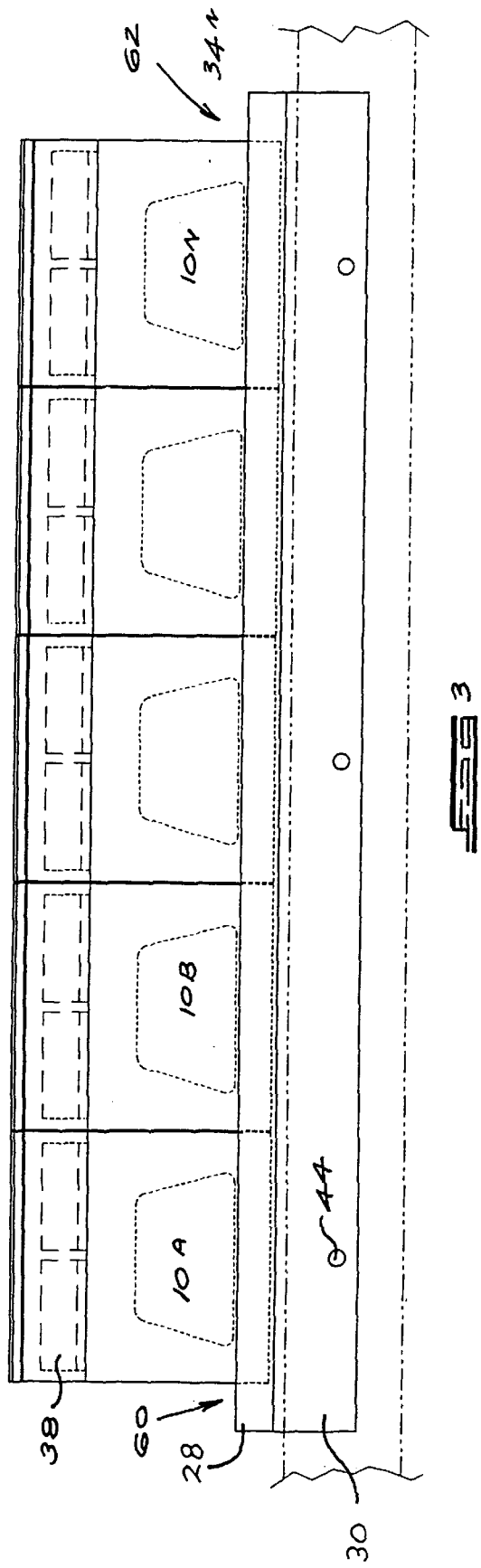

COMPOSITE SCRAPER BLADE

BACKGROUND OF THE INVENTION

This invention relates generally to a conveyor belt scraper.

Scrapers which are used for scraping high speed conveyor belts, such as steel core belts or Kevlar belts, may encounter a number of problems.

In the first instance heat build up may occur in the scraper and the belt as a result of friction. Secondly, scrapers which are movable away from the belt may tend to chatter as the scrapers move away from, and then towards, the belt.

The aforementioned factors generally give rise to rapid wear of the scraper blades or result in deterioration of or damage to the belt.

SUMMARY OF THE INVENTION

The invention provides a conveyor belt scraper which includes an elastomeric base member, a holder engaged with the base member and a wear resistant scraping insert engaged with the holder.

The base member may be of a first material and the holder may be of a second material which is more wear resistant than the first material. Similarly the insert may be of a third material which is more wear resistant than the second material.

The first material may be a polyurethane or any other suitable resilient material.

The second material may be a ceramic material.

The third material may be of any appropriate kind and preferably is a carbide or nitride material.

The base member may include a first end section which is engageable with support means and a second end section with which the holder is engaged.

The support means may be of any appropriate kind and preferably includes a U-shaped channel which has a cross-sectional shape which is complementary to the shape of the first end section. The first end section may be engageable with a sliding action with the support means.

The base member may include one or more formations which at least partially cover the support means.

The base member may include one or more formations to encourage flexing of the base member in a lateral sense i.e. in a direction which is transverse to the direction in which the base member extends.

The holder may include a keying formation or formations with which the base member is engaged.

The invention also provides a scraper assembly which includes an elongate carrier which is engageable with a support beam and a plurality of scrapers attached to the carrier.

The scrapers may be of any appropriate kind and preferably are of the type described hereinbefore.

Each scraper may be engageable with the carrier with a sliding action.

The carrier may include a first, upwardly facing channel member which receives and engages with lower ends of the scrapers and a second, downwardly facing channel member which is engageable with the said support beam. The downwardly facing channel member may be secured to the support beam using one or more fasteners of any appropriate kind.

BRIEF DESCRIPTION OF THE DRAWINGS

The invention is further described by way of examples with reference to the accompanying drawings in which:

FIG. 1 is a side view of a primary belt scraper according to one form of the invention, FIG. 2 is a side view of a secondary belt scraper according to a different form of the invention, and FIG. 3 is an end view of a conveyor belt scraper assembly according to the invention.

DESCRIPTION OF PREFERRED EMBODIMENTS

FIG. 1 of the accompanying drawings illustrates a primary belt scraper 10 according to the invention which includes a carrier 12, a base member 14, a holder 16 and a scraping insert 18 engaged with the holder.

The scraper 10 is positioned so that the scraping insert 16 bears against a downwardly directed outer surface 20 of a conveyor belt 22 which passes over a conveyor drum 24 which rotates in the direction of an arrow 26.

The carrier 12, in this example of the invention, includes a first upwardly facing channel member 28 and a second downwardly facing channel member 30 which is fixed back-to-back to the member 28 in any appropriate way for example by means of welding. The channel member 28 has side walls 32 which taper inwardly towards one another.

The base member 14 is made from polyurethane in a moulding process. The base member includes a lower end section 34 which is complementary in cross-sectional shape to the cross-sectional internal shape of the channel member 28 and the end section is inserted, with a close fit, into the channel member. The base member has a recessed formation 36 which extends from one side wall of the base member laterally into the base member.

The holder 16 is made from a ceramic material. It includes two downwardly facing recessed formations 38, see FIG. 3, and the material of the base member at an upper end section thereof, during the moulding process, is caused to flow into and fill the recesses so that a secure bond is formed between the holder and the base member.

At its upper end the holder 16 is formed with a slot 40 and the wear resistant insert 18 is located in and fixed to the slot, protruding from the slot. The insert 18 is preferably of a carbide or nitride material and it is fixed to the ceramic holder using a suitable adhesive or, alternatively, use is made of a friction fit.

The wear resistant insert 18 is harder and more wear resistant than the holder 16 which in turn is more wear resistant than the base member 14.

The downwardly facing channel member 30 nestles on the top of a support beam 42 which is shaped so that it closely receives the channel member. Use is made of one or more pins or bolts 44 which pass through registering holes in the beam and the channel member to secure the channel member to the beam.

Use may be made of any appropriate mechanism, not shown, to adjust the position of the support beam in a lateral sense, and vertically, as is indicated by means of double headed arrows 46 and 48 respectively. In this way the scraper assembly can be adjusted to ensure that the scraping insert is brought into contact with the belt surface 20 with the appropriate degree of force.

The wear resistant insert 18 exerts a scraping action on the surface 20. As the insert is of a significantly hard and wear resistant material i.e. carbide or nitride, it is able to withstand the heat which is generated when scraping of a high speed belt takes place. The cost of the insert is higher than the cost of the ceramic holder 16 and use is made of the holder 16 to secure the insert indirectly to the base member 14 for the holder may be of a size which facilitates bonding of the base member to the holder.

As the insert 18 wears its position may be adjusted by moving the position of the support beam. In any event a fair amount of automatic adjustment of the position of the insert takes place due to the resilient nature of the base member 14 which initially is installed with a certain degree of stress so that as the insert wears the base member 14 can move to its unstressed position and thereby keep the insert in contact with the surface 20.

Once that portion of the insert 18 which protrudes from the holder 16 has worn away then scraping action is achieved by means of the embedded portion of the insert and the surrounding surface of the holder 16. Thus the ceramic holder is also used to accomplish scraping action.

It is to be noted that the recessed formation 36 enables flexing of the base member 14 to take place, in a lateral or vertical sense, when irregularities on the surface 20 cause deflection of the scraper. This type of motion is allowed for and dampened by the base member and the incidence of chatter is reduced.

FIG. 2 illustrates the principles of the invention applied to a scraper 50 which is used as a secondary belt scraper. Where applicable the same reference numerals as are used in FIG. 1 are used in FIG. 2 to indicate components which are the same or similar.

The secondary scraper as shown in FIG. 2 has a scraping action which is similar to that described in connection with the FIG. 1 embodiment and consequently is not further described herein. The following different features of construction are to be noted.

A lower section 34 of the base member 14 has a rectangular shape and the upwardly facing channel member 28 has a complementary rectangular shape. The side walls do not taper inwardly as is the case with the FIG. 1 embodiment. Consequently although the base member may be engaged with a sliding action with the upwardly facing channel member a more appropriate way of interengaging these components is simply to insert the lower end of the base member 14 directly into the upwardly facing channel section. The base member is then secured to the channel section by making use of a pin 52 or any other appropriate fastener. The pin passes through registering holes 54 in the side walls of the channel section and through a passage 56 in the base member.

The recessed formations 38 in the holder 16 are traversed by one or more holes 58. When the polyurethane material of the base member 14 enters the formation 38 it also fills the holes 58 and in this way provides a more positive keying or locking action which ensures that the holder is securely fixed to the base member.

The carrier 12 is also varied in that the channel member is extended downwardly and has inwardly extending lips 30A which abut the underside of the beam 42. Clearly, the carrier is engaged, only with a sliding action, with the beam, and the lips act together with a fastener 44 to secure the carrier to the beam. Similarly the carrier can only be disengaged from the beam with a sliding action.

FIG. 3 is an end view of a scraper mounting assembly according to the invention. The assembly is further described herein with reference to belt scrapers of the kind shown in FIGS. 1 and 2 but it is to be understood that the principles thereof are not confined to these scrapers and that the assembly may be constructed using scrapers of any appropriate kind.

The support beam 42 extends transversely to the direction of run of the belt 22 (not shown in FIG. 3). The individual scrapers, designated 10A, 10B, . . . 10N, respectively are assembled beforehand, in cartridge fashion, by sliding the scrapers one after the other onto the upwardly facing channel member 28 so that, as is shown in FIG. 1, the lower ends 34 of the individual scrapers are engaged with the inwardly tapering side walls of the channel member 28 and are correctly positioned relatively to one another along the length of the channel member. The downwardly facing channel member 30 is then engaged with the beam 42 and adjusted to the correct lateral position so that the fasteners 44 may be used to secure the assembly to the beam. If the channel member has the construction shown in FIG. 2 then the fasteners 44, or equivalent devices, are used, primarily, to prevent the channel member from sliding along the beam.

Means may be provided at each opposed end 60, 62 of the array of scrapers to prevent unwanted lateral movement of the scrapers relatively to the channel member.

An important benefit of the invention is that the individual scraping inserts 18 are resiliently biased by the respective base members 14 into scraping engagement with the conveyor belt scraper. Consequently as wear of each insert takes place, and this occurs at different rates for the various inserts, the respective members 14 are capable of individual and appropriate biasing or restoring actions to ensure that the positions of the respective scraping inserts are individually adjusted, according to requirement, to maintain optimum scraping action.

If the cartridge of scrapers shown in FIG. 3 must be refurbished or replaced then simply by removing the fasteners 44 the assembly can be disengaged from the beam 42 and a fresh pre-assembled cartridge of scrapers can be engaged with the beam. It is therefore a relatively simple and rapid process to restore full scraping action to a scraper.

What is claimed is:

1. A scraper assembly which includes first and second channel members which are fixed back-to-back to each other, and a plurality of scrapers engaged with the first channel member, each scraper having an elastomeric base member with a lower end section which is complementary in shape to, and which is engaged with, the first channel member, a ceramic holder with at least one keying formation whereby an upper end section of the base member is bonded to the holder, and a wear resistant scraping insert fixed to and protruding from the holder.

2. A conveyor belt scraper, which comprises:
    an elastomeric base member made from a first material;
    a holder which is engaged with the base member and which is made from a second material; and
    a wear resistant scraping insert which is engaged with the holder and which is made from a third material;
    the third material being more wear resistant than the second material, and the second material being more wear resistant than the first material; and
    wherein the base member has a lower end section which is slidingly engageable with a carrier.

3. The scraper according to claim 2, wherein the second material is a ceramic material.

4. The scraper according to claim 2, wherein the third material is a carbide or nitride material.

5. The scraper according to claim 2, wherein the base member includes one or more formations to encourage flexing of the base member in a direction which is transverse to the direction in which the base member extends.

6. The scraper according to claim 5, wherein said one or more formations are at a position between the lower end section of the base member and the holder.

7. The scraper according to claim 2, wherein the holder includes a keying formation or formations with which the base member is engaged.

8. A scraper assembly which includes an elongate carrier which is engageable with a support beam and a plurality of scrapers attached to the carrier, each scraper being according to claim 2.

9. The scraper assembly according to claim 8, wherein the elongate carrier has a first channel member with an internal cross-sectional shape, which is complementary to the cross-sectional shape of the lower end section of the base member, said lower end section being slidingly engageable with the first channel member.

10. The scraper assembly according to claim 9, wherein the first channel member has side walls which taper inwardly towards one another.

11. The scraper assembly according to claim 9, wherein the elongate carrier has a second channel member which is engageable with the support beam.

12. The scraper assembly according to claim 11, wherein the second channel member has inwardly extending lips which abut a side of the support beam so that the second channel member is engageable with, and disengageable from, the support beam only with a relative sliding action.

* * * * *